US008692564B2

(12) United States Patent
Saha et al.

(10) Patent No.: US 8,692,564 B2
(45) Date of Patent: Apr. 8, 2014

(54) SYSTEM AND METHOD FOR USE IN DETERMINING THE THICKNESS OF A LAYER OF INTEREST IN A MULTI-LAYER STRUCTURE

(75) Inventors: Atanu Saha, Bangalore (IN); Krishnamurthy Anand, Bangalore (IN); Hari Nadathur Seshadri, Bangalore (IN); Karthick Vilapakkam Gourishankar, Bangalore (IN); Filippo Cappuccini, Florence (IT)

(73) Assignee: General Electric Company, Niskayuna, NY (US)

( * ) Notice: Subject to any disclaimer, the term of this patent is extended or adjusted under 35 U.S.C. 154(b) by 416 days.

(21) Appl. No.: 13/021,328

(22) Filed: Feb. 4, 2011

(65) Prior Publication Data
US 2012/0200304 A1 Aug. 9, 2012

(51) Int. Cl.
*G01R 27/32* (2006.01)

(52) U.S. Cl.
USPC ............ 324/662; 324/649; 324/644; 324/663

(58) Field of Classification Search
USPC ........................................ 324/649
See application file for complete search history.

(56) References Cited

U.S. PATENT DOCUMENTS

| | | | |
|---|---|---|---|
| 6,512,379 B2 | 1/2003 | Harrold et al. | |
| 6,943,357 B2 | 9/2005 | Srivastava et al. | |
| 7,582,359 B2 | 9/2009 | Sabol et al. | |
| 7,584,669 B2 | 9/2009 | Dankert et al. | |
| 8,106,651 B2 * | 1/2012 | Lahiri et al. | 324/230 |
| 2003/0176808 A1 * | 9/2003 | Masuo | 600/547 |

OTHER PUBLICATIONS

Ellingson et al.,"Optical NDE Methods for Ceramic Thermal Barrier Coatings", Materials Evaluation, a Journal of the American Society for Nondestructive Evaluation, Nov. 2005, pp. 1-17.
Wu et al., "Failure detection of thermal barrier coatings using impedance spectroscopy", Thin Solid Films, 457 (2004), pp. 301-306.
Anderson et al., "Impedance spectroscopy study of plasma sprayed and EB-PVD thermal barrier coatings", Surface & Coatings Technology, 185 (2004), pp. 106-119.

* cited by examiner

*Primary Examiner* — Thomas F Valone
(74) *Attorney, Agent, or Firm* — Andrew J. Caruso

(57) ABSTRACT

A method for use in determining the thickness of a layer of interest in a multi-layer structure. A first electrode is positioned in contact with a first surface of the multi-layer structure, and a second electrode is positioned in contact with a second surface of the multi-layer structure. The second surface is substantially opposite the first surface. The first electrode is pressed against the multi-layer structure at a predetermined sampling pressure, and the structure is optionally adjusted to a predetermined sampling temperature. The electrical impedance between the first electrode and the second electrode is measured.

8 Claims, 4 Drawing Sheets

SYSTEM AND METHOD FOR USE IN DETERMINING THE THICKNESS OF A LAYER OF INTEREST IN A MULTI-LAYER STRUCTURE

BACKGROUND OF THE INVENTION

The subject matter disclosed herein relates generally to structure measurement and, more specifically, to systems and methods for use in determining the thickness of a layer of interest in a multi-layer structure.

At least some known measurement systems determine the impedance between two surfaces of a structure using electrodes. The electrodes are electrically coupled to the structure with a conductive contact medium, such as silver paste. Notably, the use of media like silver paste may introduce a considerable delay before a stable impedance measurement can be achieved. Further, after a measurement is made and the electrodes are removed, residual silver paste must be cleaned from the structure. Accordingly, such measurement systems are associated with significant time and labor costs.

BRIEF DESCRIPTION OF THE INVENTION

In one aspect, a system for determining a thickness of a layer of interest in a multi-layer structure is provided. The system includes a sample engaging member. The sample engaging member includes a first electrode having a first sample contact surface configured to be positioned in contact with a first surface of the multi-layer structure. The system also includes a second electrode having a second sample contact surface configured to be positioned in contact with a second surface of the multi-layer structure. The second surface is opposite the first surface. The system further includes a pressure control device configured to press the first electrode against the multi-layer structure substantially at a predetermined sampling pressure. The sampling pressure is a pressure at which an electrical impedance of the sample tracks a reference impedance associated with the sample. The system also includes a measurement device that is electrically coupled to the first electrode and the second electrode. The measurement device is configured to measure an electrical impedance between the first electrode and the second electrode.

In another aspect, a device for determining a thickness of a layer of interest in a multi-layer structure is provided. The device includes a sample engaging member and a force application device coupled to the sample engaging member. The sample engaging member includes an electrode having a sample contact surface and a force application surface opposite the sample contact surface. The sample contact surface is configured to be positioned in contact with a surface of the multi-layer structure. The sample engaging member also includes a temperature adjustment element that is configured to adjust a temperature of the multi-layer structure. The force application device is configured to apply a force to the force application surface of the electrode.

In yet another aspect, a method for determining a thickness of a layer of interest in a multi-layer structure is provided. The method includes positioning a first electrode in contact with a first surface of the multi-layer structure. A second electrode is positioned in contact with a second surface of the multi-layer structure. The second surface is substantially opposite the first surface. The first electrode is pressed against the multi-layer structure at a predetermined sampling pressure, and a temperature of the multi-layer structure is adjusted to a predetermined sampling temperature. An electrical impedance is measured between the first electrode and the second electrode.

BRIEF DESCRIPTION OF THE DRAWINGS

The embodiments described herein may be better understood by referring to the following description in conjunction with the accompanying drawings.

DETAILED DESCRIPTION OF THE INVENTION

The embodiments described herein facilitate determining the thickness of a layer of interest in a multi-layer structure without the use of an adherent conductive medium such as silver paste. In exemplary embodiments, a first electrode is positioned directly in contact with a surface of a multi-layer structure and pressed against the surface at a predetermined sampling pressure. Further, the temperature of the structure may be adjusted to a predetermined sampling temperature. A second electrode is positioned in contact with another surface of the structure, and an electrical property, such as impedance between the two electrodes, is measured.

The layer of interest may be an internal layer of the multi-layer structure. For example, a component designed for high temperature operation may include a metal structure with a surface covered by a thermal barrier coating (TBC) that protects the metal structure from heat-induced damage. The TBC may be coupled to the metal substrate by a bond coat. As the structure is subjected to high temperatures, the bond coat may oxidize, diminishing the ability of the bond coat to couple the TBC to the metal substrate. The oxidized portion of the bond coat may be referred to as a thermally grown oxide (TGO). An accurate determination of the TGO thickness may enable timely repair and/or replacement of the structure.

An exemplary technical effect of the methods, systems, and apparatus described herein includes at least one of (a) pressing a first electrode against a multi-layer structure at a predetermined sampling pressure; (b) adjusting a temperature of the multi-layer structure to a predetermined sampling temperature; (c) measuring an electrical property between the first electrode and a second electrode; and (d) determining the thickness of a layer of interest based at least in part on the measured electrical property.

Figure 1:
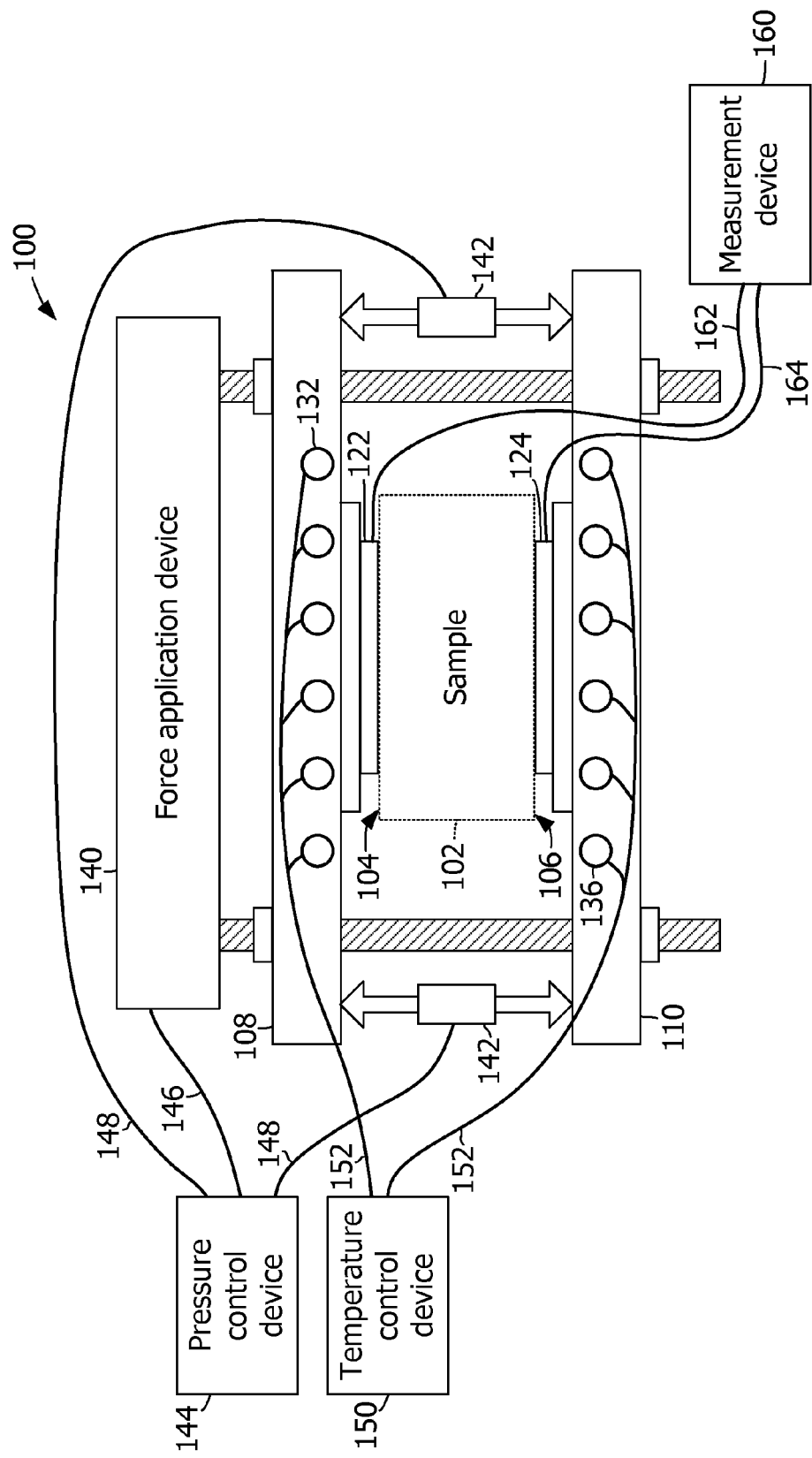
FIG. 1 is a diagram of an exemplary system for determining the thickness of a layer of interest in a multi-layer structure.

FIG. 1 is a block diagram of an exemplary system 100 for determining the thickness of a layer of interest in a multi-layer structure. The thickness of the layer of interest may be determined based on one or more samples 102, which include at least a portion of the multi-layer structure. For example, the multi-layer structure may be a beam, and sample 102 may represent a portion of the length of the beam. Sample 102 includes a first surface 104 and a second surface 106 substantially opposite first surface 104. System 100 includes a first sample engaging member 108 and a second sample engaging member 110.

Figure 2:
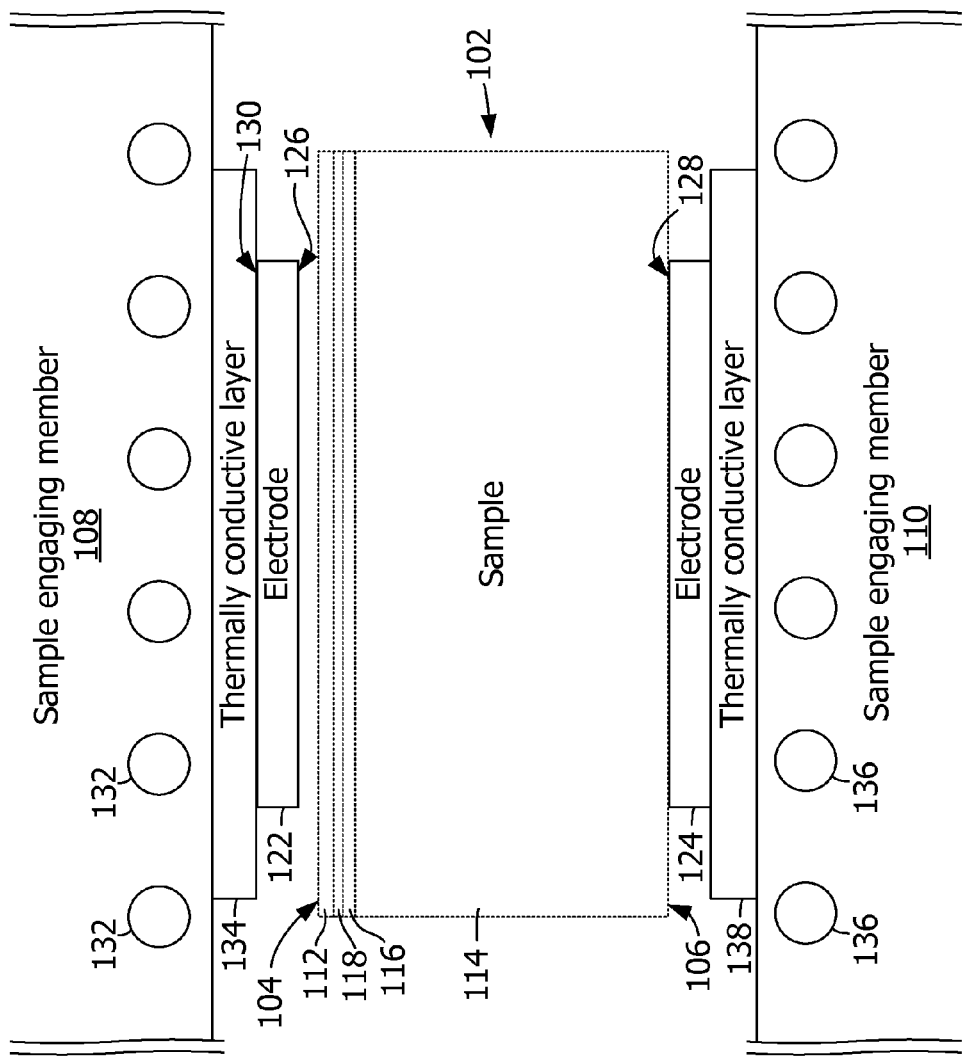
FIG. 2 is an enlarged view of the sample and the sample engaging members shown in FIG. 1.

FIG. 2 is an enlarged view of sample 102, first sample engaging member 108, and second sample engaging member 110. In an exemplary embodiment, first surface 104 of sample 102 is defined by a surface layer 112, which is coupled to a structural layer or substrate 114 by a bond coat layer 116. For example, surface layer 112 may include a thermal barrier coating (TBC), such as a ceramic material, for protecting structural layer 114 from heat-induced damage.

In operation, bond coat layer 116 may be transformed into a thermally grown oxide (TGO) layer 118 as the structure is subjected to heat. Accordingly, the thickness of TGO coat layer 118 may vary over time. Bond coat layer 116 and TGO layer 118 may exhibit different levels of impedance or some other electrical property, enabling the thickness of TGO layer 118 and/or bond coat layer 116 to be determined, as described below with reference to FIG. 3. When the thickness of TGO layer 118 exceeds a predetermined threshold, or, alternatively, when the thickness of bond coat layer 116 falls below a predetermined threshold, the structure represented by sample 102 may be repaired and/or replaced. While sample 102 is described above as having a particular composition, system 100 may enable one to determine the thickness of a layer of interest in a structure having any quantity of layers that exhibit variation in an electrical property.

In exemplary embodiments, first sample engaging member 108 includes a first electrode 122, and second sample engaging member 110 includes a second electrode 124. First electrode 122 includes a first sample contact surface 126 that is configured to be positioned in contact with first surface 104 of sample 102. Second electrode 124 includes a second sample contact surface 128 that is configured to be positioned in contact with second surface 106 of sample 102.

In some embodiments, first sample contact surface 126 has a shape corresponding to the shape of first surface 104 of sample 102. Further, second sample contact surface 128 may have a shape corresponding to the shape of second surface 106 of sample 102. As illustrated in FIG. 2, first surface 104 and second surface 106 are flat. Accordingly, first sample contact surface 126 and second sample contact surface 128 are also flat. The shape of first sample contact surface 126 and/or second sample contact surface 128 may be flat, arcuate (e.g., as described below with reference to FIG. 4), curvilinear, angular, concave, convex, and/or any other form corresponding to (e.g., complementary to) first surface 104 and/or second surface 106. Shaping sample contact surfaces 126, 128 to correspond to sample surfaces 104, 106 facilitates increasing the contact area and/or the electrical conductance between electrodes 122, 124 and sample 102.

First electrode 122 also includes a force application surface 130 opposite sample contact surface 126. In one embodiment, first electrode 122 is pressed against sample 102 by applying a force to force application surface 130 through first sample engaging member 108, as described below with reference to FIGS. 1 and 2.

Some embodiments facilitate adjusting the temperature of at least a portion of sample 102. In such embodiments, first sample engaging member 108 includes one or more temperature adjustment elements 132 and may include a thermally conductive layer 134 between temperature adjustment elements 132 and first electrode 122. Thermally conductive layer 134 may be electrically non-conductive, enabling first electrode 122 to be electrically insulated from first sample engaging member 108.

Temperature adjustment elements 132 are configured to increase and/or decrease the temperature of sample 102 by applying thermal energy to first surface 104 and/or extracting thermal energy from first surface 104, respectively. Temperature adjustment elements 132 may include, for example, a thermal conductor, an electrical heating element, a channel configured to contain and/or convey a fluid, and/or any structure suitable for heating and/or cooling sample 102. In some embodiments, second sample engaging member 110 also includes temperature adjustment elements 136 configured to adjust a temperature of sample 102 by applying thermal energy to and/or extracting thermal energy from second surface 106. Second sample engaging member 110 may also include a thermally conductive layer 138 positioned between temperature adjustment elements 136 and second electrode 124. In addition, or alternatively, insulation is positioned over second electrode 124, as described below with reference to FIG. 4.

Referring to FIGS. 1 and 2, system 100 includes a force application device 140 coupled to first sample engaging member 108 and/or second sample engaging member 110. Force application device 140 is configured to apply a force to force application surface 130 of first electrode 122 through first sample engaging member 108. Force application device 140 includes, in one embodiment, a motorized screw mechanism, a hydraulic piston, and/or any other apparatus suitable for pressing first electrode 122 against sample 102.

One or more load cells 142 are configured to measure the force applied to sample 102 by force application device 140. For example, in the embodiment illustrated by FIG. 1, force application device 140 is configured to force first sample engaging member 108 toward second sample engaging member 110. Accordingly, load cells 142 may be positioned between first sample engaging member 108 and second sample engaging member 110.

A pressure control device 144 is coupled in communication with force application device 140 and load cells 142. For example, pressure control device 144 is coupled to force application device 140 by a communication cable 146 and to load cells 142 by communication cables 148. Alternatively, pressure control device 144 may be coupled to force application device 140 and/or load cells 142 by a wireless communication channel (not shown).

Pressure control device 144 is configured to press first electrode 122 against sample 102 at a predetermined sampling pressure. In an exemplary embodiment, pressure control device 144 determines an applied pressure based at least in part on the measured force from load cells 142 and a contact area between first electrode 122 and sample 102. For example, the contact area may be determined based on the area of first sample contact surface 126 and the area of first surface 104. If first sample contact surface 126 has a shape corresponding to the shape of first surface 104, the contact area may be defined as the lesser of the area of first sample contact surface 126 and the area of first surface 104. In an exemplary embodiment, pressure control device 144 controls the force applied by force application device 140, adjusting the force until the applied pressure is substantially equal to (e.g., within 0.5%, 1%, or 5% of) the predetermined sampling pressure.

A temperature control device 150 is coupled to temperature adjustment elements 132, 136 by temperature adjustment lines 152. Temperature control device 150 is configured to adjust the temperature of at least a portion of sample 102 to a predetermined sampling temperature through temperature adjustment lines 152 and temperature adjustment elements 132, 136. In some embodiments, temperature adjustment elements 132, 136 are electric heating elements and/or chillers. In such embodiments, temperature adjustment lines 152 may be communication cables by which temperature control device 150 controls operation of temperature adjustment elements 132, 136. In addition, or alternatively, temperature adjustment lines 152 may be conductors over which an electric current is transmitted. In other embodiments, temperature adjustment elements 132, 136 are channels for containing and/or conveying a fluid. In such embodiments, temperature adjustment lines 152 may be fluid vessels (e.g., pipes and/or tubes), and temperature control device 150 may include a fluid heater and/or a fluid cooler and, optionally, a pump for circulating the fluid through the fluid vessels.

A measurement device 160 is electrically coupled to first electrode 122 and second electrode 124. For example, in one embodiment, measurement device 160 is coupled to first electrode 122 by a first conductor 162 and to second electrode 124 by a second conductor 164. Measurement device 160 is configured to measure an electrical property (e.g., impedance, resistance, inductance, and/or capacitance) between first electrode 122 and second electrode 124. For example, in one embodiment, measurement device 160 includes a power source (e.g., a potentiostat) and a frequency response analyzer (FRA) for performing electrochemical impedance spectroscopy (EIS). Additionally, measurement device 160 is further configured to determine a thickness of a layer of interest based at least in part on the measured electrical impedance, as described below with reference to FIG. 3.

Figure 3:
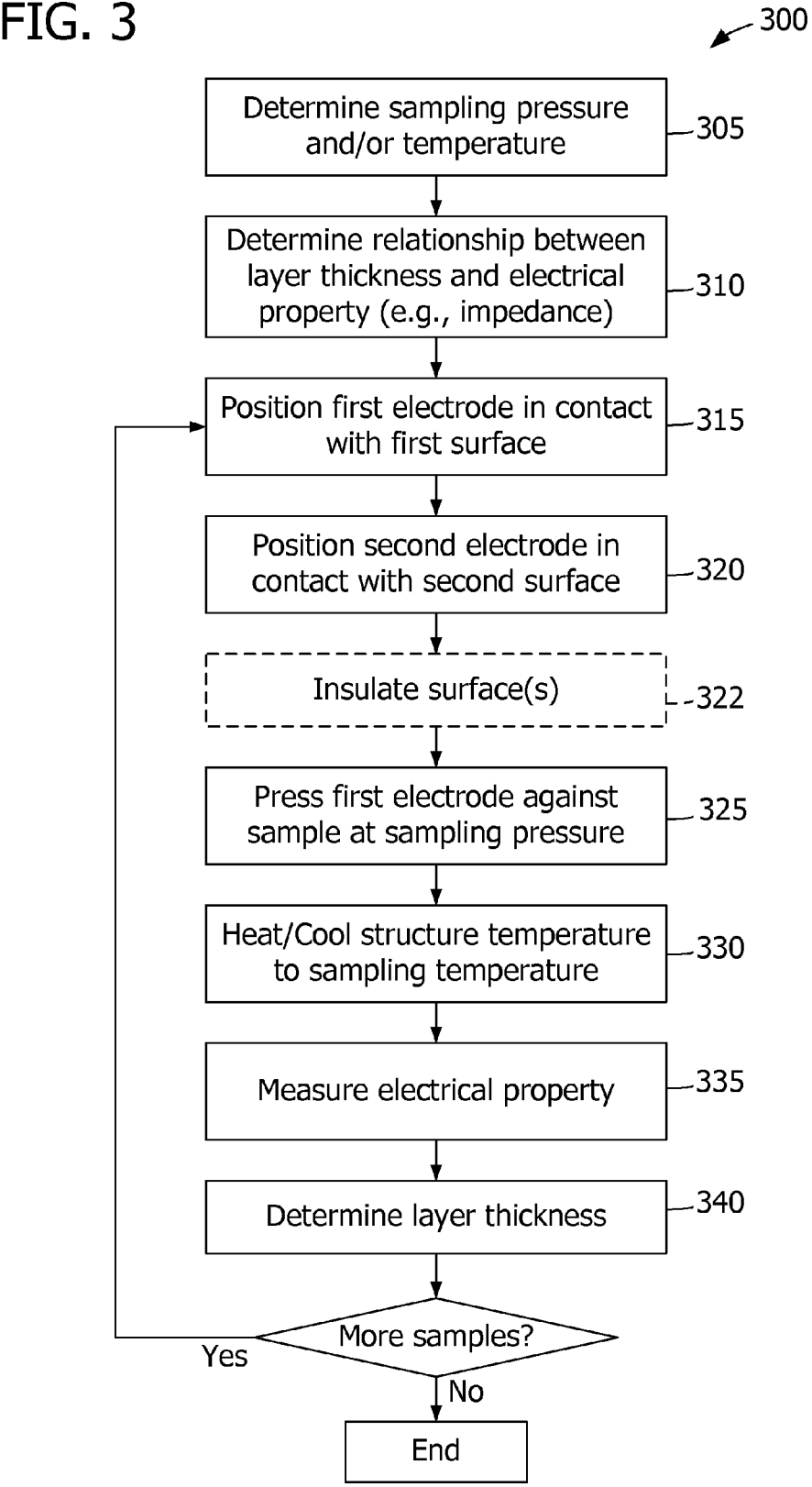
FIG. 3 is a flowchart of an exemplary method for use in determining the thickness of a layer of interest.

FIG. 3 is a flowchart of an exemplary method 300 for use in determining the thickness of a layer of interest in a multi-layer structure. Portions of method 300 may be performed using a machine and/or a computing device, such as pressure control device 144, temperature control device 150, and measurement device 160 (all shown in FIG. 1). Further, the functions of pressure control device 144, temperature control device 150, and measurement device 160 may be combined into any number of computing devices. For example, measurement device 160 may perform all the operations described with reference to pressure control device 144 and temperature control device 150.

In an exemplary embodiment, a sampling pressure and/or a sampling temperature are determined 305. The sampling pressure is a pressure at which an electrode is to be forced against the surface of a sample of the multi-layer structure. The sampling temperature is a temperature to which the multi-layer structure is to be adjusted.

In one embodiment, the sampling pressure is determined 305 for a structure experimentally. For example, a sample of the structure, or of a similar structure, is selected, and electrodes are electrically coupled to two surfaces of the sample using a viscous conductive liquid, such as silver paste. The impedance between the two electrodes is measured and considered a reference impedance. Electrodes are positioned against the surfaces of the same sample without the viscous conductive liquid, and the impedance is measured as at least one electrode is pressed against a surface of the sample at varying levels of pressure. The lowest sampling pressure that produces an impedance measurement that "tracks", or is substantially equal to (e.g., within 0.5%, 1%, or 5% of), the reference impedance is determined 305 to be the sampling pressure. In some embodiments, the process above is repeated with similar structures in which the thickness of the layer of interest is known, and the lowest sampling pressure producing impedance measurements that track the reference impedance across these similar structures is determined 305 to be the sampling pressure. While impedance is specifically described above, sampling pressure may be determined 305 as a pressure at which any electrical property tracks a corresponding reference electrical property.

The sampling temperature is determined 305 as a temperature at which the electrical property of interest (e.g., impedance) between surfaces of the multi-layer structure varies based on the thickness of the layer of interest. In one embodiment, the sampling temperature of a structure is determined 305 experimentally. For example, similar structures in which the thickness of the layer of interest is known are selected. The impedance across these similar structures is measured at varying temperatures, and the temperature at which impedance is most closely correlated with the thickness of the layer of interest is determined 305 to be the sampling temperature.

Referring to FIG. 2, in one embodiment, structural layer 114 and bond coat layer 116 are metallic and exhibit relatively negligible impedance across a broad temperature range. Surface layer 112 is an ionic conductor (e.g., a ceramic material) that exhibits relatively negligible impedance at a temperature of approximately 400 degrees Celsius (400° C.) and above. In contrast, TGO layer 118 exhibits relatively high impedance across a broad temperature range. Accordingly, at temperatures above 400° C., the impedance between first surface 104 and second surface 106 is determined primarily by the thickness of TGO layer 118, and 400° C. is determined 305 to be the sampling temperature.

Referring again to FIGS. 1 and 3, in some embodiments, the sampling pressure and/or sampling temperature are determined 305 for a multi-layer structure in a controlled setting (e.g., in a laboratory) and then applied to a plurality of reproductions of the multi-layer structure. As one example, the sampling pressure and sampling temperature for a particular component are associated with a part number corresponding to the component and subsequently used in determining the thickness of the layer of interest in any component associated with the same part number.

The relationship between the thickness of the layer of interest and an electrical property (e.g., impedance, inductance, and/or capacitance) is determined 310, in some embodiments, using the same data used to determine 305 the sampling pressure and/or sampling temperature. For example, in one embodiment, the values of measured impedance and layer thickness corresponding to the sampling temperature are plotted in a graph, and a function defining a best-fit line is calculated to express the relationship between layer thickness and impedance. Accordingly, in exemplary embodiments, the relationship between layer thickness and the electrical property that corresponds to the structure being evaluated by method 300 is determined 310 based on a structure that is similar to or representative of the evaluated structure.

Referring to FIGS. 1 and 3, first electrode 122 is positioned 315 in contact with first surface 104 of a sample 102 of the multi-layer structure. Second electrode 124 is positioned 320 in contact with second surface 106 of sample 102. In an exemplary embodiment, sample 102 is positioned between first sample engaging member 108, which includes first electrode 122, and second sample engaging member 110, which includes second electrode 124.

Pressure control device 144 presses 325 first electrode 122 against sample 102 (e.g., against first surface 104) at the sampling pressure through force application device 140. In exemplary embodiments, pressure control device 144 monitors the amount of force being applied by force application device 140 using load cells 142. The applied force is divided by the contact area between first electrode 122 and first surface 104 to calculate the pressure being applied. Pressure control device 144 adjusts the force applied by force application device 140 such that the applied pressure is substantially equal to (e.g., within 0.5%, 1%, or 5% of) the sampling pressure.

Temperature control device 150 adjusts 330 (e.g., heats or cools) the temperature of at least a portion of sample 102 substantially to (e.g., within 0.5%, 1%, or 3% of) the sampling temperature. In an exemplary embodiment, temperature control device 150 operates temperature adjustment elements 132 to adjust the temperature of sample 102 at first surface 104. Adjusting 330 the temperature of sample 102 by direct contact facilitates achieving the sampling temperature with increased precision and in less time relative to other methods of temperature adjustment, such as convection. In some embodiments, temperature control device 150 also operates temperature adjustment elements 136 to adjust the temperature of sample 102 at second surface 106. In addition, or alternatively, second surface 106 is insulated 322.

Measurement device 160 measures 335 an electrical property between first electrode 122 and second electrode 124. In some embodiments, measurement device 160 measures 335 an electrical impedance, such as by applying electrochemical impedance spectroscopy (EIS). In an exemplary embodiment, measurement device 160 applies an alternating current or voltage input signal between first electrode 122 through first conductor 162 and second electrode 124 through second conductor 164 over a predetermined frequency range (e.g., 100 Hertz to 1 megahertz). The signal is produced by a power source, which may include, without limitation, a potentiostat. Other measured electrical properties may include inductance, capacitance, and/or any other property suitable for use with the methods described herein.

The thickness of the layer of interest (e.g., bond coat layer 116 or TGO layer 118, shown in FIG. 2) is determined 340 based at least in part on the measured electrical property. In exemplary embodiments, the thickness is determined 340 based on the measured electrical impedance and the relationship between thickness and impedance that was previously determined 310.

In some embodiments, multiple samples 102 of the structure are evaluated using method 300. In one embodiment, regularly spaced portions of the structure are treated as samples 102. For each sample 102, electrodes 122, 124 are positioned 315, 320, first electrode 122 is pressed 325 against the sample 102, the temperature of the sample 102 is adjusted 330, the electrical impedance is measured 335, and the thickness of the layer of interest is determined 340. In some embodiments, if the thickness of the layer of interest corresponding to any sample 102 is outside an acceptable range of values (e.g., specified in nanometers, micrometers, or millimeters), the structure is repaired and/or replaced.

Figure 4:
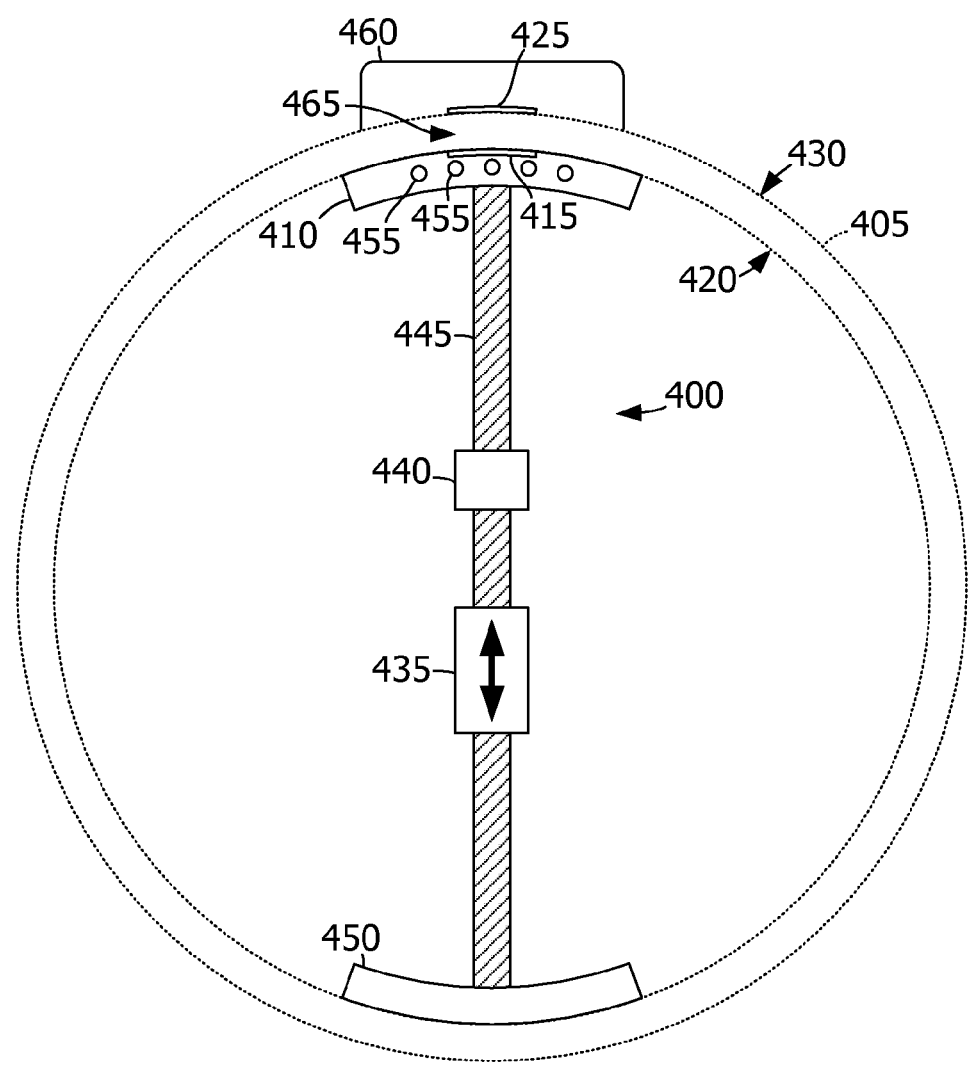
FIG. 4 is a diagram of an exemplary device for use in determining the thickness of a layer of interest in a cylindrical structure.

FIG. 4 is a diagram of an exemplary device 400 for use in determining the thickness of a layer of interest in a cylindrical structure 405. Device 400 includes a sample engaging member 410 with a first electrode 415. Sample engaging member 410 and first electrode 415 are positioned against an inner surface 420 of cylindrical structure 405. A second electrode 425 is positioned against an outer surface 430 of cylindrical structure 405. First electrode 415 and second electrode 425 are formed in arcuate shapes to correspond to the shape of inner surface 420 and outer surface 430, respectively. In operation, first electrode 415 and second electrode 425 are coupled to a measurement device 160 (shown in FIG. 1).

Device 400 includes a force application device 435, which is similar in operation to force application device 140 (shown in FIG. 1). More specifically, force application device 435 presses first electrode 415 against inner surface 420. The force applied by force application device 435 is measured by a load cell 440, which is similar in operation to load cells 142 (shown in FIG. 1).

In an exemplary embodiment, force application device 435 is coupled to sample engaging member 410 by a shaft 445. Shaft 445 is also coupled to a structure engaging member 450 opposite sample engaging member 410. Like first electrode 415, sample engaging member 410 and structure engaging member 450 has a shape corresponding to the shape of inner surface 420. As force application device 435 exerts an expansive force along shaft 445, sample engaging member 410 and structure engaging member 450 are pressed against inner surface 420. In exemplary embodiments, force application device 435 and load cell 440 are coupled in communication with a pressure control device 144 (shown in FIG. 1).

Sample engaging member 410 also includes a plurality of temperature adjustment elements 455, which are similar in operation to temperature adjustment elements 132, 136 (shown in FIGS. 1 and 2). Temperature adjustment elements 455 adjust the temperature of inner surface 420 proximate first electrode 415. In exemplary embodiments, temperature adjustment elements 455 are coupled to a temperature control device 150 (shown in FIG. 1).

In some embodiments, insulation 460 is positioned on outer surface 430 proximate second electrode 425. Insulation 460 facilitates providing a consistent temperature between first electrode 415 and second electrode 425 when temperature adjustment elements 455 are operated.

The portion of cylindrical structure 405 between first electrode 415 and second electrode 425 may be referred to as a sample 465. In one embodiment, the thickness of a layer of interest in cylindrical structure 405 is determined for a plurality of samples 465 by rotating device 400 with respect to cylindrical structure 405. As one example, ten samples 465, each separated by approximately thirty-six degrees of rotation, are evaluated according to method 300 (shown in FIG. 3).

Embodiments provided herein enable determining the thickness of a layer of interest, such as a thermally grown oxide (TGO) layer, within a multi-layer structure. Further, exemplary embodiments produce an accurate determination of thickness in a short amount of time and without requiring the removal of an adherent contact or conductive medium.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in determining a thickness of a layer of interest in a multi-layer structure, said system comprising:
    a sample engaging member comprising a first electrode having a first sample contact surface configured to be positioned in contact with a first surface of the multi-layer structure;
    a second electrode having a second sample contact surface configured to be positioned in contact with a second surface of the multi-layer structure, wherein the second surface is opposite the first surface;
    a pressure control device configured to press said first electrode against the multi-layer structure substantially at a predetermined sampling pressure, wherein the sampling pressure is a pressure at which an electrical impedance of the sample tracks a reference impedance associated with the sample; and
    a measurement device electrically coupled to said first electrode and said second electrode, said measurement device configured to measure an electrical impedance between said first electrode and said second electrode.

2. A system according to claim 1, wherein said measurement device is further configured to determine a thickness of the layer of interest based at least in part on the measured electrical impedance.

3. A system according to claim 2, wherein said measurement device is further configured to determine a thickness of the layer of interest based further on a predetermined relationship between electrical impedance and the thickness of the layer of interest that corresponds to the multi-layer structure.

4. A system according to claim 1, further comprising:
    a force application device coupled to said sample engaging member and coupled in communication with said pressure control device; and
    a load cell coupled in communication with said pressure control device and configured to measure a force applied to the multi-layer structure by said force application device, wherein said pressure control device is configured to press said first electrode against the multi-layer structure at the predetermined sampling pressure based at least in part on the measured force and a contact area between said first sample contact surface and the multi-layer structure.

5. A system according to claim 1, wherein said sample engaging member further comprises one or more temperature adjustment elements configured to adjust a temperature of the multi-layer structure.

6. A system according to claim 5, further comprising a temperature control device coupled to said temperature adjustment elements and configured to adjust the temperature of the multi-layer structure to a predetermined sampling temperature through said temperature adjustment elements.

7. A system according to claim 5, wherein said sample engaging member is a first sample engaging member comprising a plurality of first temperature adjustment elements, said system further comprising a second sample engaging member, said second sample engaging member comprising:
    said second electrode; and
    a plurality of second temperature adjustment elements.

8. A system according to claim 1, wherein said measurement device is configured to measure the electrical impedance between said first electrode and said second electrode over a predetermined frequency range.

* * * * *